(12) United States Patent
Strazisar et al.

(10) Patent No.: US 9,392,088 B2
(45) Date of Patent: Jul. 12, 2016

(54) INTELLIGENT MUTING OF A MOBILE DEVICE

(71) Applicant: Lenovo (Singapore) Pte. Ltd., Singapore (SG)

(72) Inventors: Bradley Park Strazisar, Cary, NC (US); Toby John Bowen, Durham, NC (US); Scott Edwards Kelso, Cary, NC (US); John Weldon Nicholson, Cary, NC (US); Steven Richard Perrin, Raleigh, NC (US); Matthew Price Roper, Raleigh, NC (US); Song Erin Wang, Cary, NC (US); Jianbang Zhang, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/737,312

(22) Filed: Jan. 9, 2013

(65) Prior Publication Data

US 2014/0194102 A1 Jul. 10, 2014

(51) Int. Cl.
*H04M 1/60* (2006.01)
*H04M 1/725* (2006.01)

(52) U.S. Cl.
CPC ........ *H04M 1/6008* (2013.01); *H04M 1/72569* (2013.01); *H04M 1/72577* (2013.01); *H04M 2250/12* (2013.01)

(58) Field of Classification Search
CPC ............... H04M 2250/22; H04M 2250/62; H04M 1/19; H04M 1/72519; H04M 1/72522; H04M 1/605; H04M 1/72569; H04M 1/03; H04M 1/72563; H04M 1/72577; G01S 2013/9371; G01S 3/8083; G06F 1/1684; G06F 1/1694; G06F 2200/1637; G06F 3/0346; H04W 52/02; H04W 88/02; H04W 4/02; H04W 52/0254
USPC .............. 455/418, 421, 414.1, 550.1, 556.1; 379/421
See application file for complete search history.

(56) References Cited

U.S. PATENT DOCUMENTS

| | | | |
|---|---|---|---|
| 7,142,666 B1 * | 11/2006 | Bates et al. | 379/421 |
| 7,532,714 B1 * | 5/2009 | Miller et al. | 379/202.01 |
| 2004/0141418 A1 * | 7/2004 | Matsuo et al. | 367/124 |
| 2011/0319128 A1 * | 12/2011 | Miwa | 455/550.1 |
| 2013/0288655 A1 * | 10/2013 | Foruntanpour et al. | 455/418 |

* cited by examiner

*Primary Examiner* — George Eng
*Assistant Examiner* — Umair Ahsan
(74) *Attorney, Agent, or Firm* — Schwegman, Lundberg & Woessner, P.A.

(57) ABSTRACT

A device includes a transceiver, a microphone, a sensor, and a controller coupled to receive signals from the sensor and to place the device into a mute mode when the signals from the sensor are indicative of a user action to reduce transmission of the user's voice.

13 Claims, 2 Drawing Sheets

INTELLIGENT MUTING OF A MOBILE DEVICE

BACKGROUND

It is difficult to speak to a person both on a mobile device and to one or more people in the same physical proximity as the device user. Conversation meanings among all parties can become confused. Currently, the only solution is for the user to manually mute the device by touching or pushing a button, move the device's microphone far enough away from his or her head to create a muffled effect, or for the user to put his or her fingers or hand over the device's microphone.

SUMMARY

A device includes a transceiver, a microphone, a sensor, and a controller coupled to receive signals from the sensor and to place the device into a mute mode when the signals from the sensor are indicative of a user action to reduce transmission of the user's voice.

A method includes sensing movement of a device while a call being hosted by the device is in progress, placing the device in a mute mode if the sensed movement exceeds a selected amount of movement indicative of a user moving the device away from their mouth, and unmuting the device if the sensed movement is indicative of a user moving the device back to their mouth.

In a further embodiment, a computer readable storage device may be used to store instructions to cause a mobile device to perform the method.

DETAILED DESCRIPTION

Figure 1:
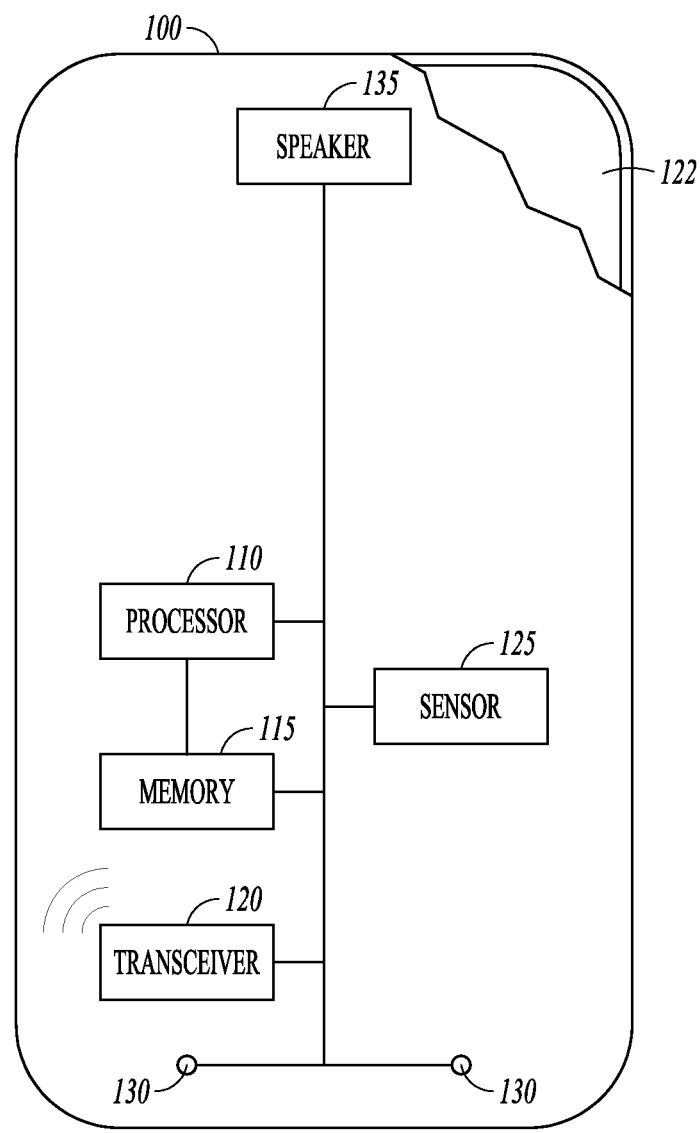
FIG. 1 is a block diagram of a mobile device to perform intelligent muting according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In various embodiments, an internal gyroscope of a mobile device is utilized to sense the device being moved away from a user's mouth. In one embodiment, the device senses when the user is talking. If the device senses that the user rotated the mobile device a designated angular distance up or down from his or her mouth. Sensing this change in orientation, the mobile device activates its microphone mute feature. When the device is returned back to its approximate original position, the device may switch out of mute, allowing the user to resume conversation with the person on the device. Many mobile devices utilize microelectromechanical system (MEMS) type gyroscopes, also known as a vibrating structure gyroscope, for gaming applications. The same gyroscope may be used to determine a rotation of the mobile device away from a user's mouth.

In further embodiments, a microphone array that includes at least two spaced apart microphones may be added to the mobile device, allowing the device to measure distance and direction of sounds using triangulation or time difference of arrival for example. Using the microphone array in conjunction with the internal gyroscope, false mute triggers assumed by the gyroscope may be alleviated.

In one embodiment, two microphones may be used to determine background noise. The microphone array may be used to determine a level of background noise which could be maintained while the speech signal is attenuated. For example, if the mute is triggered, resulting in complete silence after a short burst of indistinct speech, the person on the other end of the line may think the call has been dropped. Relative volume may also be used with front and back facing microphones to detect movement of the device away from a user's mouth.

In yet a further embodiment a microphone or microphones may be used to detect the use of a specified verbal cue such as "hold on" to activate the device's mute feature, and "I'm back" to indicate to the device to unmute.

In various embodiments, the microphone or microphones may be used to determine if the user has moved away from the mobile device, which is likely indicative of the user trying to speak to someone in the vicinity of the user versus the person on the call via the mobile device. In yet a further embodiment, a proximity sensor or audio processing may be used to determine if a user is covering the microphone with their hand or a part of their body rather than trying to speak into the microphone.

Regardless of which sensing mechanism is utilized, the mobile device attempts to determine the intended recipient of communications, and appropriately mute the microphone on the mobile device. One or more sensors may be used to provide signals that are indicative of user movements to reduce transmission of the user's voice via the device. One of the signals may be used, or input from several different types of sensors may be combined and fused together using logic, such as fuzzy logic to arrive at a decision of whether or not to mute or unmute the microphone of the mobile device. In one embodiment, the sensor readings regarding a combination of angular position, angular rate of change, and user distance from microphone are combined using a fuzzy logic approach. In one embodiment, each sensor reading results in an indication or whether to mute or unmute the device, and the majority indication is followed.

FIG. 1 is a block diagram of a mobile device 100. The mobile device includes a processor 110 and memory 115 to hold executable instructions for the processor to perform functions of the mobile device. A transceiver 120 provides for communications with other devices to exchange voice and data in various embodiments. A portion of a touch screen 122 or other display device driven by processor 110 or other device driver is also illustrated.

In one embodiment, a sensor, such as a gyroscope 125 is coupled to the processor to provide signals representative of the device being rotated away from the user's mouth. The processor 110 may then place the device into a mute mode such that sound is not transmitted via the transceiver, and a listener on the other end of a communication session may not mistake conversation by the user between a person proximate the user as intended for the listener.

In further embodiments, the sensor 125 comprises an accelerometer, which may be provide signals to the processor 110 representative of the distance a phone is moved. Such signals may also be representative of the device 100 being moved away from a user's mouth.

A microphone 130 and speaker 135 are also provided. In further embodiments, microphone 130 comprises an array of spaced microphones, allowing for determination of the distance of the users mouth from the device. The microphone 130 and speaker 135 are both coupled to the processor 110 to receive voice signals and process the signals to determine when the microphone has been moved away from the mouth of the user and provide additional information to the processor 110. The additional information may be combined to override false positives indicated by the signal from the gyroscope 125. If the user turns their heard sharply while still speaking into the microphone 130, the gyroscope 125 may provide a signal indicative of the device being moved away from the mouth of the user, but the signal from the microphone 130 will indicate that the user's mouth is still near the microphone 130, and most likely moved in synch with the device and user's head. The signal from the microphone may be used to stop transition of the device 100 to mute.

Figure 2:
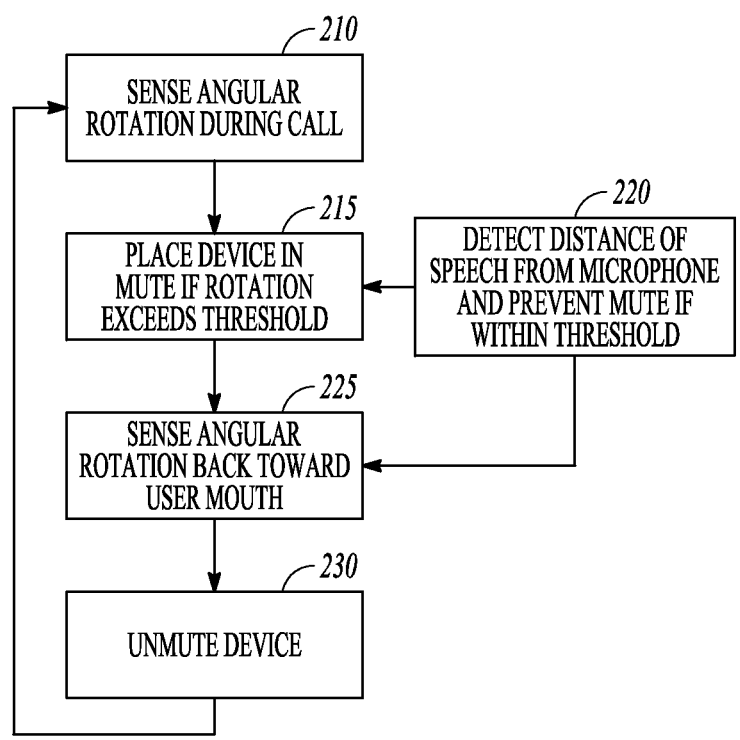
FIG. 2 is a flowchart representation of a method to perform intelligent muting according to an example embodiment.

FIG. 2 is a flowchart illustrating a method 200 of muting and unmuting a mobile device according to detected angular rotation of the mobile device. The method may take the form of a computer program stored in memory 115 and executed by processor 110, forming a mute controller during a call. Method 200 may be operational when a call is placed or received. At 210, the mobile device senses angular rotation during the call and provides indications of the amount of angle that the phone was rotated to block 215. At 215, the device determines if the angle exceeds a selected threshold indicative of a user rotating a phone away from their mouth in order to carry on a conversion with someone in their presence. The selected angle may be preset at time of manufacture of the mobile device, and in some embodiments may be varied by the user. Angles as low as 5 to 25 degrees may be used and angles over 25 degrees, such as 45 degrees or larger may be used in some embodiments.

In some embodiments, additional information may be sensed, such as the angular velocity of the rotation, which may also be combined with the amount of angular rotation to determine whether or not mute the mobile device. In still further embodiments, an accelerometer may be used to provide information representative of the user simply pulling the mobile device away from their ear a selected distance, or other motion indicative of a user trying to communicate directly with others in their presence other than with the person on the other end of the conversation being hosted by the mobile device. Moving the mobile device several inches to a foot or more may trigger a mute in some embodiments. The information from the accelerometer may be used in conjunction with information from the gyroscope or independently from the gyroscope information to be indicative of a user conversing with someone else nearby.

At 220, the microphone array, or other sensor may be used to detect a distance of speech by the user from the mobile device. This detection may also be indicative of whether or not the user is attempting to communicate directly with someone not receiving communications via the mobile device. Certain motions, such as the user turning their head sharply while still communicating directly via the mobile device may result in a positive determination at 215 that the mobile device was rotated at least the selected distance. However, the rotation does not result in the mobile device being moved away from the ear and mouth of the user. The information collected at 220 indicating the user is still communicating via the mobile device is then used at 215 to prevent the device from otherwise transitioning into a mute mode. The information collected at 220 may be used override a false positive from either or both of the accelerometer and gyroscope in some embodiments.

At 225, the gyroscope may provide signals that indicate that the mobile device has been rotated a sufficient angle as to be likely being used to communicate again. At such a detection, the mobile device may be unmuted at 230 to allow the user to speak to the other person connected to the mobile device. Again, the detected distance from the microphone may be detected at 220 and override such a transition if the detected distance is indicative of the user rotating the mobile device, yet still holding it away from their mouth. The user in some embodiments may select both the angular rotations for muting and unmuting, as well as the distances for overriding such transitions.

Following unmuting at 230, control may be returned to block 210 to sense a further angular rotation during the call. The method will exit upon the call ending.

Examples

1. A device comprising:
a transceiver;
a microphone to capture a user's voice;
a sensor; and
a controller coupled to receive signals from the sensor and to place the device into a mute mode when the signals from the sensor are indicative of a user action to reduce transmission of the user's voice via the transceiver.

2. The device of example 1 wherein the sensor comprises a gyroscope.

3. The device of example 2 wherein the signals indicative of a user action to reduce transmission of the user's voice correspond to a rate of change of an angular rotation of the device of at least a selected amount.

4. The device of any of examples 1-3 wherein the sensor signals are indicative of at least one or more of a user moving the device away from the user's mouth and a user holding a hand over a microphone of the device.

5. The device of any of examples 1-4 wherein the sensor further comprises:
an accelerometer to provide signals indicative of the device being moved, wherein a movement of at least a selected distance is indicative of a user moving the device away from the user's mouth; and
a microphone proximity sensor indicative of a microphone being moved away from the user's mouth.

6. The device of any of examples 1-5 wherein the sensor comprises multiple sensors to sense angular position of the device, angular rate of change, and user distance from the microphone, and wherein signals from the sensors are fused together to provide an indication of whether to place the device in the mute mode.

7. The device of any of examples 1-6 wherein the microphone provides a distance signal indicative of a distance of a user's mouth from the device, and wherein the controller uses the distance signal to override placing the device in a mute mode when the device is detected as having been rotated, but is still within a selected distance of the user's mouth.

8. The device of any of examples 1-7 wherein the microphone comprises an array of microphones providing at least one or more of a time difference of arrival information and triangulation information corresponding to the user's voice.

9. The device of any of examples 1-8 wherein the controller operates to detect a spoken command by a user indicating to mute the device and to unmute the device.

10. A method comprising:
sensing movement of a device while a call being hosted by the device is in progress;
placing the device in a mute mode if the sensed movement exceeds a selected amount of movement; and
unmuting the device if the sensed movement is indicative of a user moving the device back to their mouth.

11. The method of example 10 wherein the movement is angular rotation indicative of a user moving the device away from their mouth.

12. The method of example 11 wherein sensing movement of the device comprises:
sensing angular position of the device;
sensing angular rate of change of the device;
sensing user distance from the microphone; and
providing an indication of whether to place the device in the mute mode as a function of a combination of two or more of the sensed angular position, sensed angular rate of change, and sensed user distance from the microphone.

13. The method of any of examples 10-12 and further comprising:
determining a distance of an origin of a user's voice via a microphone array; and
overriding muting of the device based on the determined distance.

14. The method of any of examples 10-13 wherein the movement is a distance as measured by an accelerometer.

15. The method of any of examples 10-14 wherein the movement is an angular rotation, a distance, and a movement representative of a microphone being moved away from a user's voice.

16. The method of any of examples claim 10-15 and further comprising providing at least one or more of time difference of arrival information and triangulation information to determine a distance of a user's voice from a microphone array on the device.

17. A computer readable storage device having instructions to cause a mobile device to perform a method, the method comprising:
sensing movement of a device while a call being hosted by the device is in progress;
placing the device in a mute mode if the sensed movement exceeds a selected amount of movement indicative of a user moving the device away from their mouth; and
unmuting the device if the sensed movement is indicative of a user moving the device back to their mouth.

18. The computer readable storage device of example 17 wherein the movement is angular rotation.

19. The computer readable storage device of any of examples 17-18 wherein sensing movement of the device comprises:
sensing angular position of the device;
sensing angular rate of change of the device;
sensing user distance from the microphone; and
fusing together signals from the sensing to provide an indication of whether to place the device in the mute mode.

20. The computer readable storage device of any of examples 17-20, wherein the method further comprises:
determining a distance of an origin of a user's voice via a microphone array; and
overriding muting of the device based on the determined distance.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A device comprising:
a transceiver;
a first sensor comprising an array of microphones to capture a user's voice to provide at least one of time difference of arrival information and triangulation information corresponding to the user's voice;
a second sensor to sense angular movement of the device while a call is being hosted by the device; and
a controller coupled to the transceiver and the sensor to receive the at least one of time difference of arrival information and triangulation information and use such information to determine a distance of a user's voice from the array of microphones, and to place the device into a mute mode in response to the sensed angular movement exceeds a selected amount of movement, and overriding muting of the device in response to the distance not exceeding a mute distance threshold, and unmuting the device if the sensed angular movement is indicative of a user moving the device back to their mouth.

2. The device of claim 1 wherein the second sensor comprises a gyroscope.

3. The device of claim 2 wherein the second sensor further comprises an angular rotation sensor to provide signals indicative of a user action to reduce capture of the user's voice that correspond to a rate of change of an angular rotation of the device of at least a selected amount corresponding to the microphone being moved away from the user's mouth.

4. The device of claim 1 wherein the first sensor provides signals indicative of a user holding a hand over a microphone of the device.

5. The device of claim 1 wherein the second sensor further comprises:
an accelerometer to provide signals indicative of the device being moved, wherein a movement of at least a selected distance is indicative of a user moving the device away from the user's mouth; and
wherein the first sensor comprises a microphone proximity sensor indicative of a microphone being moved away from the user's mouth.

6. The device of claim 1 wherein the first and second sensors comprise multiple sensors to sense angular position of the device, angular rate of change, and user distance from the microphone, and wherein signals from the sensors are fused together to provide the signals indicative of a user action to reduce capture of the user's voice by the microphone and thereby to reduce transmission of the user's voice via the transceiver.

7. The device of claim 1 wherein the array of microphones provide a distance signal indicative of a distance of a user's mouth from the device as a function of voice signals, and wherein the controller uses the distance signal to override placing the device in a mute mode when the device is detected as having been rotated, but is still within a selected distance of the user's mouth.

8. A method comprising:
   sensing angular movement of a device while a call being hosted by the device is in progress;
   determining a distance of a user's voice from an array of microphones that provide at least one of time difference of arrival information and triangulation information corresponding to the users voice;
   placing the device in a mute mode such that sound is not transmitted by the device if the sensed angular movement exceeds a selected amount of movement indicative of a user action to reduce capture of the user's voice
   overriding muting of the device based on the determined distance of the user's voice from the array of microphones not exceeding a threshold; and
   unmuting the device if the sensed movement is indicative of a user moving the device back to their mouth.

9. The method of claim 8 wherein the angular movement includes angular rotation indicative of a user moving the device away from their mouth.

10. The method of claim 9 wherein sensing angular movement of the device comprises:
    sensing angular position of the device;
    sensing angular rate of change of the device;
    sensing user distance from the array of microphones; and
    providing an indication of whether to place the device in the mute mode as a function of a combination of two or more of the sensed angular position, sensed angular rate of change, and sensed user distance from the microphone.

11. The method of claim 8 wherein the angular movement is an angular rotation, a distance, and a movement representative of the array of microphones being moved away from a user's voice.

12. A computer readable storage device having instructions to cause a mobile device to perform a method, the method comprising:
    sensing angular movement of a device while a call being hosted by the device is in progress;
    determining a distance of a user's voice from an array of microphones that provide at least one of time difference of arrival information and triangulation information corresponding to the users voice;
    placing the device in a mute mode if the sensed angular movement exceeds a selected amount of movement indicative of a user moving the device away from their mouth;
    overriding muting of the device based on the determined distance of the user's voice from the array of microphones not exceeding a threshold; and
    unmuting the device if the sensed movement is indicative of a user moving the device back to their mouth.

13. The computer readable storage device of claim 12 wherein sensing angular movement of the device comprises:
    sensing angular position of the device;
    sensing angular rate of change of the device;
    sensing user distance from the array of microphones; and
    fusing together signals from the sensing to provide an indication of whether to place the device in the mute mode.

\* \* \* \* \*